No. 887,247. PATENTED MAY 12, 1908.
H. H. GEIGER.
PLANTER AND FERTILIZER DROPPER.
APPLICATION FILED AUG. 16, 1907.
2 SHEETS—SHEET 2.
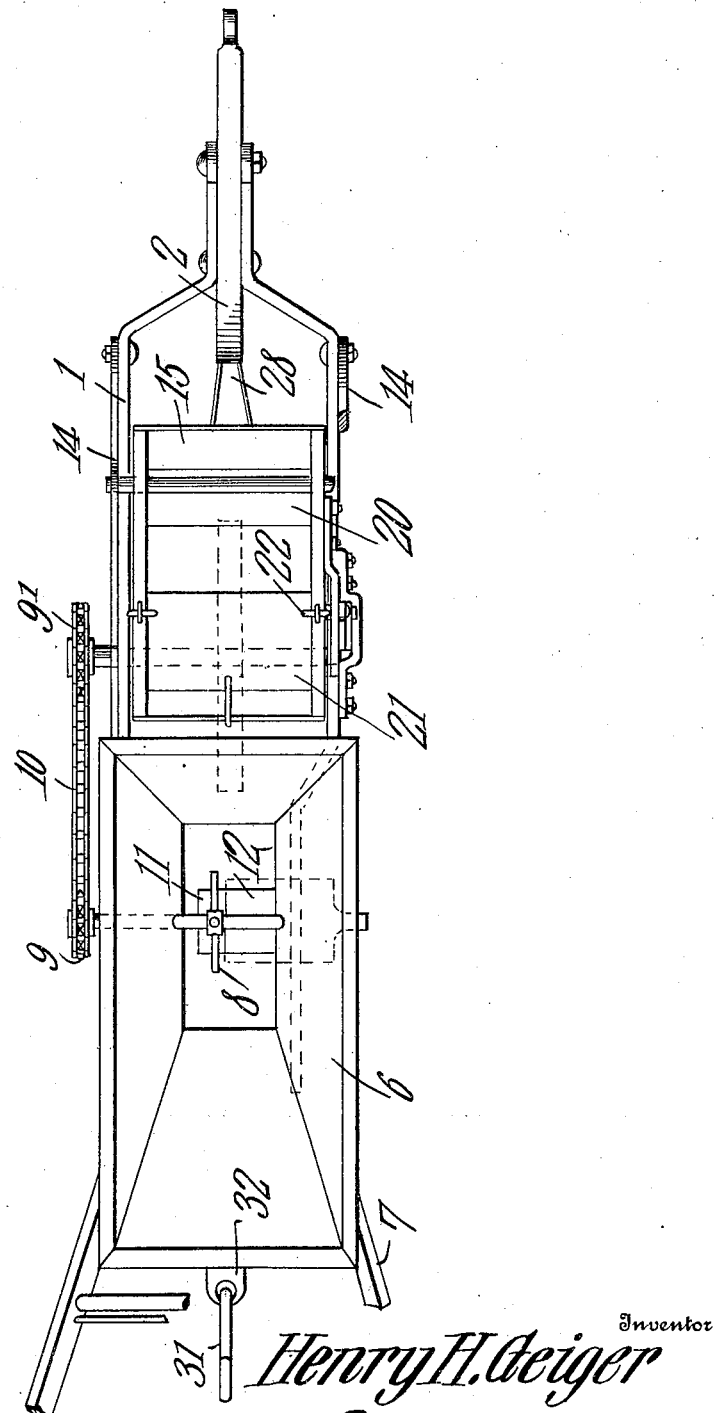
Witnesses
E. F. Stewart
R. M. Tuitt.
Inventor
Henry H. Geiger
By C. A. Snow & Co.
Attorneys

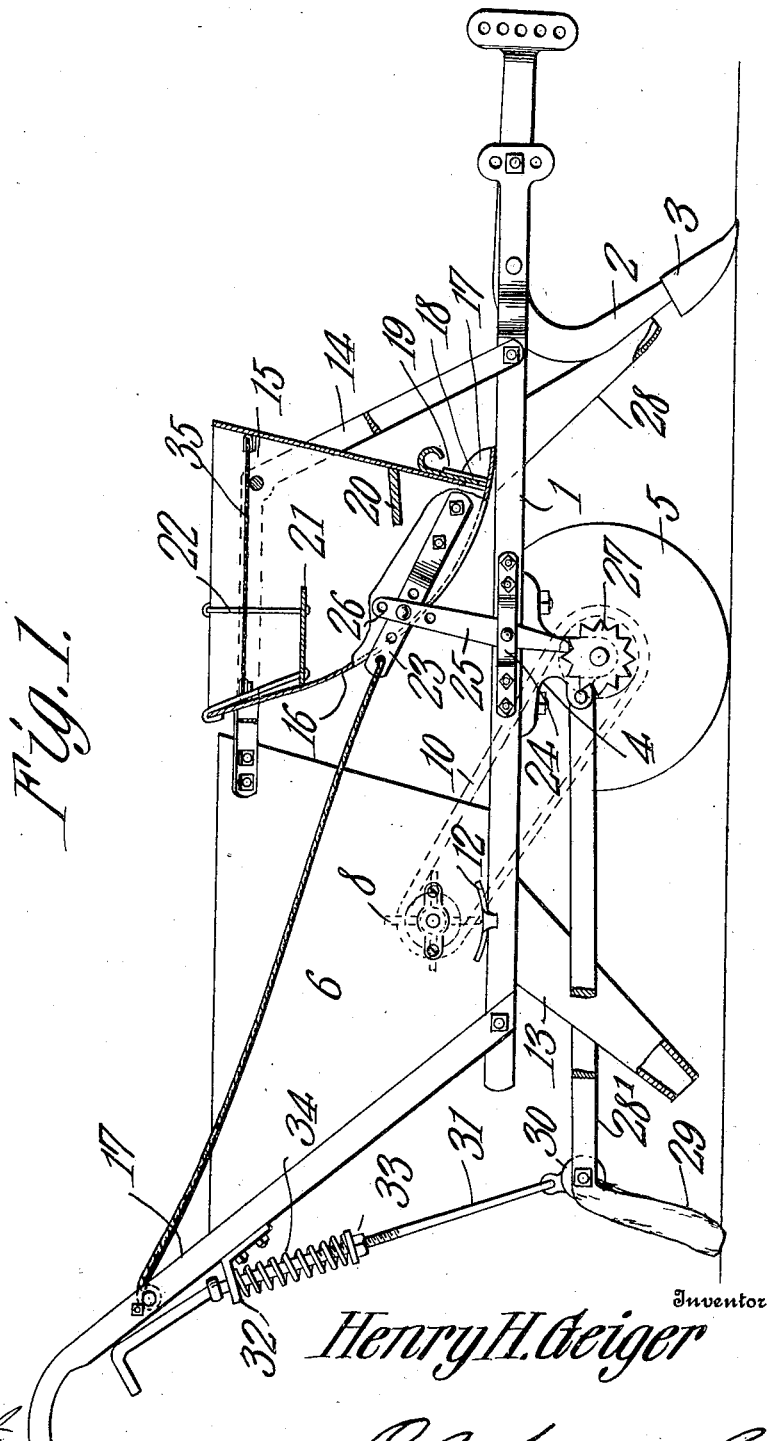

UNITED STATES PATENT OFFICE.

HENRY H. GEIGER, OF GRIFFIN, GEORGIA.

PLANTER AND FERTILIZER-DROPPER.

No. 887,247.　　　　Specification of Letters Patent.　　　Patented May 12, 1908.

Application filed August 16, 1907. Serial No. 388,885.

*To all whom it may concern:*

Be it known that I, HENRY H. GEIGER, a citizen of the United States, residing at Griffin, in the county of Spalding and State of Georgia, have invented a new and useful Planter and Fertilizer-Dropper, of which the following is a specification.

This invention has relation to planters and fertilizer droppers and it consists in the novel construction and arrangement of its parts as hereinafter shown and described.

The object of the invention is to provide an implement of the character indicated of simple and cheap construction and one which is effective and positive in its operation.

With this object in view the invention consists in the construction hereinafter shown and described and included in the claims.

In the accompanying drawing:—Figure 1 is a side elevation of the planter and fertilizer dropper with parts broken away, and Fig. 2 is a top plan view of the same.

The implement consists of the frame 1 to the forward end of which is attached a standard 2. The furrow opener 3 is attached to said standard. The brackets 4 depend from the sides of the frame 1 and the ground wheel 5 is journaled for rotation between the said brackets. The seed hopper 6 is mounted upon the rear portion of the frame 1 as are also the handles 7. The stirrer 8 is journaled for rotation in the hopper 6 and one end of the shaft is provided with a sprocket wheel 9. The sprocket wheel 9′ is fixed to the wheel 5 and the sprocket chain 10 passes around the wheels 9 and 9′.

The hopper 6 is provided in its bottom with an outlet opening 11, the capacity of which is regulated by means of a sliding valve 12. When grain is being passed through the hopper 6 a drill tube 13 is attached to the bottom thereof for the purpose of preventing the grain from being affected by the wind when falling from the said hopper. The angle irons 14 are attached at their rear ends to the hopper 6 and at their forward ends to the forward portion of the frame 1. The fertilizer hopper 15 is pivotally mounted between the irons 14. The hopper 15 is of peculiar configuration. In side elevation it is substantially in the form of a sector of a circle with the curved side rearwardly disposed and in end elevation it is of cuneate form with the reduced portion downwardly disposed. The curved side 16 of the hopper 15 extends beyond the lower forward edge of the front side thereof and is formed into a lip 17. The front side of the hopper 15 is provided with an opening 18 over which a sliding valve 19 is adapted to operate and which regulates the capacity of flow through the said opening.

The lower forward portion of the hopper 15 is provided with an inclined ledge 20 which is adapted to support the weight of the greater portion of the material in the upper part of the hopper and thus prevent the fertilizer from wedging or choking in the lower portion of the hopper. A detachable ledge 21 is provided with hangers 22 which are adapted to engage the upper edges of the hopper 15 and hold the ledge 21 in elevated position against the curved side 16 of the hopper. The ledge 21 is intended to be used when the material is damp and may be readily removed from the hopper at other times. When it is in position in the hopper it is oppositely disposed with relation to the ledge 20 and consequently the said ledges substantially constitute baffle plates which reduce the tendency of soggy material to pack. The arm 23 is attached to the side of the hopper 15. A clip 24 is attached to the side of the frame 1 and a lever 25 is fulcrumed to said clip. The working end of the lever 25 is pivoted to the arm 23 and the said lever and arm are each provided with a series of perforations 26, whereby, the pivotal point of connection between the said parts may be adjusted to regulate the movement of the hopper 15 as will hereinafter appear. A star wheel 27 is attached to the side of the ground wheel 5 and the power end of the lever 25 operates against the periphery of the wheel 27.
The chute 28 is attached to the frame 1 with its upper end under the lip 17 of the hopper 15 and its lower end behind the furrow opener 3. The standards 28′ are pivotally connected at their forward ends to the brackets 4 and are provided at their rear ends with the coverers 29. A weight 30 is attached to rear portions of the standards 28′ and the lower end of the rod 31 is connected to said weight 30. An eye 32 is attached to the rear side of the hopper 6 and the rod 31 passes through said eye. An adjustable collar 33 is mounted upon the rod 31 and a coil spring 34 is interposed between the eye 32 and collar 33. The said spring is under tension with a tendency to force the said collar away from the said eye.

From the foregoing description it is obvious that as the implement is drawn along the surface of the ground the furrow opener 3 will open a furrow in the soil in which fertilizer will be deposited from the hopper 15 which is maintained in a state of reciprocation upon its pivots through the instrumentality of the arm 23, lever 25 and star wheel 27. At the same time the stirrer 8 is rotated in the hopper 6 by the sprocket wheels 9 and 9' and the chain 10. Thus, the seed will be deposited from the hopper 6 upon the fertilizer previously dropped and the seed and fertilizer will be covered with soil by the coverers 29. The hopper 15 is provided with a screen 35 located in its upper portion which is adapted to prevent lumps of fertilizer from entering the lower portion of said hopper.

Having described my invention what I claim as new and desire to secure by Letters-Patent is:—

1. In an implement as described a hopper pivotally supported, oppositely disposed ledges located within the hopper and forming baffle plates, said hopper having an opening below the baffle plates and means for swinging the hopper.

2. In an implement as described, a hopper pivotally supported and being in the form of a sector in side elevation, oppositely disposed ledges located within the hopper and forming baffle plates, said hopper having an opening in its side at the lower end of its curved side and means for swinging the hopper.

In testimony that I claim the foregoing as my own, I have hereto affixed my signature in the presence of two witnesses.

HENRY H. GEIGER.

Witnesses:
J. A. DRUERY,
W. H. WHEATON.